United States Patent
Zhang

(10) Patent No.: US 10,244,446 B2
(45) Date of Patent: Mar. 26, 2019

(54) TRIGGERING TERMINAL ROAMING BY ACCESS POINT

(71) Applicant: Huawei Technologies Co., Ltd., Shenzhen (CN)

(72) Inventor: Lin Zhang, Suzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/494,307

(22) Filed: Apr. 21, 2017

(65) Prior Publication Data
US 2017/0311218 A1    Oct. 26, 2017

(30) Foreign Application Priority Data

Apr. 22, 2016  (CN) .......................... 2016 1 0257449

(51) Int. Cl.
*H04W 36/08* (2009.01)
*H04W 36/38* (2009.01)
(Continued)

(52) U.S. Cl.
CPC ....... *H04W 36/08* (2013.01); *H04W 36/0072* (2013.01); *H04W 36/38* (2013.01);
(Continued)

(58) Field of Classification Search
CPC .......................... H04W 36/08; H04W 72/0453
See application file for complete search history.

(56) References Cited

U.S. PATENT DOCUMENTS 6,847,620 B1 * 1/2005 Meier ................. H04L 12/4641
                                                          370/328
7,889,663 B1 * 2/2011 Wright ................. H04W 24/06
                                                          370/241
(Continued)

FOREIGN PATENT DOCUMENTS

EP         1601221 A1    11/2005
WO     2015154927 A1    10/2015

OTHER PUBLICATIONS

Maria et al.,"Cross-layer techniques for Wireless Local Area Networks," XP055399541, University of Grenoble Dec. 19, 2013). (Year: 2013).*

(Continued)

*Primary Examiner* — Parth Patel
(74) *Attorney, Agent, or Firm* — Leydig, Voit & Mayer, Ltd.

(57) ABSTRACT

This application relates to the communications field, and in particular, to a method for triggering terminal roaming by an access point (AP) and an access point. In the method, a first AP sends, by using a first channel, a unicast channel switching message to a first terminal associated with the first AP, where the unicast channel switching message is used to instruct the first terminal to switch from the first channel to a second channel, a receiver address of the unicast channel switching message is an address of the first terminal, the first channel is an operating channel of the first AP, and the second channel and the first channel are different; and retains the first channel as the operating channel of the first AP after the unicast channel switching message is sent. According to the method, a process of associating with a new AP can be simplified.

3 Claims, 2 Drawing Sheets

(51) Int. Cl.
*H04W 72/04* (2009.01)
*H04W 36/00* (2009.01)
*H04W 76/25* (2018.01)
*H04W 76/04* (2009.01)
*H04W 84/12* (2009.01)
*H04W 88/08* (2009.01)

(52) U.S. Cl.
CPC ..... *H04W 72/042* (2013.01); *H04W 72/0453* (2013.01); *H04W 76/045* (2013.01); *H04W 76/25* (2018.02); *H04W 84/12* (2013.01); *H04W 88/08* (2013.01)

(56) References Cited

U.S. PATENT DOCUMENTS

| | | | | |
|---|---|---|---|---|
| 8,023,468 | B2* | 9/2011 | Liu | H04W 48/12 370/331 |
| 8,682,279 | B2* | 3/2014 | Rudolf | H04W 4/22 455/404.1 |
| 9,838,261 | B2* | 12/2017 | Chen | H04L 41/12 |
| 9,967,906 | B2* | 5/2018 | Verkaik | H04L 12/189 |
| 2006/0007882 | A1* | 1/2006 | Zeng | H04L 45/00 370/328 |
| 2006/0072532 | A1* | 4/2006 | Dorenbosch | H04L 12/185 370/342 |
| 2006/0094400 | A1* | 5/2006 | Beachem | H04L 63/101 455/410 |
| 2006/0098607 | A1* | 5/2006 | Zeng | H04L 45/16 370/338 |
| 2006/0154609 | A1* | 7/2006 | Takano | H04B 17/29 455/67.13 |
| 2006/0223527 | A1* | 10/2006 | Lee | H04W 48/08 455/432.2 |
| 2006/0251021 | A1* | 11/2006 | Nakano | H04W 36/0038 370/331 |
| 2007/0026807 | A1* | 2/2007 | Kish | H04B 7/0408 455/63.4 |
| 2007/0064655 | A1* | 3/2007 | Ruuska | H04W 28/18 370/332 |
| 2007/0097921 | A1* | 5/2007 | Choi | H04L 45/54 370/331 |
| 2007/0177549 | A1* | 8/2007 | Lo | H04W 36/18 370/331 |
| 2007/0206537 | A1* | 9/2007 | Cam-Winget | H04L 63/162 370/331 |
| 2007/0255834 | A1* | 11/2007 | Abhishek | H04W 36/0055 709/226 |
| 2008/0009290 | A1* | 1/2008 | Yoon | H04W 36/0033 455/436 |
| 2008/0298333 | A1* | 12/2008 | Seok | H04W 8/005 370/338 |
| 2009/0086689 | A1* | 4/2009 | Hunt | H04W 28/06 370/338 |
| 2009/0141685 | A1* | 6/2009 | Berglund | H04W 36/0055 370/331 |
| 2010/0100627 | A1* | 4/2010 | Evans | H04W 76/14 709/227 |
| 2010/0266130 | A1* | 10/2010 | Lin | H04L 9/0819 380/279 |
| 2011/0103264 | A1* | 5/2011 | Wentink | H04W 8/005 370/255 |
| 2011/0216688 | A1* | 9/2011 | Katori | H04W 72/005 370/312 |
| 2012/0307792 | A1* | 12/2012 | Ram | H04W 74/006 370/331 |
| 2013/0055301 | A1* | 2/2013 | Hao | H04H 20/423 725/14 |
| 2013/0086665 | A1* | 4/2013 | Filippi | H04L 63/0272 726/7 |
| 2013/0195001 | A1* | 8/2013 | Liu | H04L 69/04 370/312 |
| 2014/0119358 | A1* | 5/2014 | Xu | H04L 61/103 370/338 |
| 2014/0233443 | A1* | 8/2014 | Kumar | H04L 12/12 370/311 |
| 2015/0249953 | A1* | 9/2015 | Kim | H04W 48/14 370/254 |
| 2015/0264614 | A1* | 9/2015 | Stager | H04W 36/0061 370/332 |
| 2016/0156392 | A1* | 6/2016 | Jung | H04W 72/048 370/338 |
| 2016/0183172 | A1* | 6/2016 | Lee | H04W 48/06 370/329 |
| 2016/0198501 | A1* | 7/2016 | Verkaik | H04W 76/022 370/329 |
| 2016/0212635 | A1* | 7/2016 | Cho | H04W 24/02 |
| 2016/0234672 | A1* | 8/2016 | Cho | H04W 24/02 |
| 2016/0261430 | A1* | 9/2016 | Lepp | H04L 12/4641 |
| 2017/0223587 | A1* | 8/2017 | Trainin | H04W 36/08 |
| 2017/0280363 | A1* | 9/2017 | Tenny | H04W 36/04 |
| 2018/0054759 | A1* | 2/2018 | Seok | H04W 48/10 |

OTHER PUBLICATIONS

Berezin et al.,"Multichannel Virtual Access Points for Seamless Handoffs in IEEE 802.11 Wireless Networks," 2011 IEEE 73rd Vehicular Technology Conference (VTC Spring), XP031896952, Institute of Electrical and Electronics Engineers, New York, New York (May 15, 2011).

Berezin et al.,"Cross-layer techniques for Wireless Local Area Networks," XP055399541, University of Grenoble (Dec. 19, 2013).

* cited by examiner

TRIGGERING TERMINAL ROAMING BY ACCESS POINT

CROSS-REFERENCE TO RELATED APPLICATIONS

This application claims priority to Chinese Patent Application No. 201610257449.5, filed on Apr. 22, 2016, which is hereby incorporated by reference in its entirety.

TECHNICAL FIELD

Embodiments of this disclosure relate to the communications field, and in particular, to a method for triggering terminal roaming by an access point (AP) and an access point.

BACKGROUND

In a wireless local area network (WLAN), if an access point needs to trigger terminal roaming, for a terminal that supports wireless network management, an AP associated with the terminal can instruct, by using a basic service set transition mechanism, the terminal to roam and to associate with a new AP. For a terminal that does not support wireless network management, an AP currently associated with the terminal sends a disassociation frame or a deauthentication frame to the terminal, so as to disassociate from the terminal and trigger terminal roaming.

However, after disassociating from the original AP, the terminal that does not support wireless network management becomes a terminal that is not associated with any AP. When the terminal that is not associated with any AP attempts to associate with a new AP, the terminal may need to be re-authenticated, resulting in a long service interruption time of the terminal.

SUMMARY

This application describes a method for triggering terminal roaming by an access point and an access point, so that an AP can trigger smooth roaming of a terminal.

According to a first aspect, a method for triggering terminal roaming by an access point is provided. The method includes: sending, by a first AP by using a first channel, a unicast channel switching message (for example, a unicast channel switch announcement (CSA) frame) to a first terminal associated with the first AP, where the unicast channel switching message is used to instruct the first terminal to switch from the first channel to a second channel, a receiver address (RA) of the unicast channel switching message is an address of the first terminal, the first channel is an operating channel of the first AP, and the second channel and the first channel are different; and retaining the first channel as the operating channel of the first AP after the unicast channel switching message is sent.

The first AP instructs a terminal associated with the first AP to switch to another channel, but the first AP remains on the original operating channel. The first AP does not use a new operating channel for working. After switching to a new operating channel, the terminal cannot find the AP associated with the terminal, and attempts to associate with a new AP. Because the terminal is in an associated state at this moment, a process of associating with a new AP can be simplified. In this way, the AP triggers smooth roaming of the terminal.

In optional implementation, the first AP receives an instruction message sent by a second AP. The instruction message instructs a second terminal associated with the second AP to switch to the first channel, and the instruction message includes a basic service set identifier (BSSID) of the second AP and an address of the second terminal. The BSSID may be a radio medium access control (MAC) address of the second AP. An operating channel of the second AP and the first channel are different. The first AP transmits a data frame to the second terminal according to the address of the second terminal. The address may be a MAC address of the second terminal. A BSSID field of the data frame is filled in with the BSSID of the second AP.

After the second terminal hands over to the first AP on the first operating channel, the first AP sends and receives a data frame for the second terminal by simulating the second AP according to the MAC address of the second terminal and the BSSID of the second AP, so that the second terminal can still send and receive a data frame normally. That is, before the second terminal roams, a service interruption time of the second terminal is reduced.

In optional implementation, the first AP receives an instruction message sent by a second AP. The instruction message instructs a second terminal associated with the second AP to switch to the first channel, and the instruction message includes a BSSID of the second AP and an address of the second terminal. An operating channel of the second AP and the first channel are different. The first AP sends a simulation beacon frame to the second terminal at a first power by using the first channel. A first address field of the simulation beacon frame includes the address of the second terminal, a second address field of the simulation beacon frame includes the BSSID of the second AP, and a third address field of the simulation beacon frame includes the BSSID of the second AP. The first power is less than a default transmit power of the first AP.

After the second terminal switches to the operating channel of the first AP, the first AP can send, at a power that is less than the default transmit power of the first AP, the simulation beacon frame to the second terminal by means of unicast, or send, at a gradually decreasing transmit power, the simulation beacon frame to the second terminal by means of unicast. When a simulation beacon frame signal detected by the second terminal is weak, it is very likely that the second terminal proactively initiates roaming. Therefore, in this implementation, terminal roaming can be triggered. In addition, in another optional manner of triggering terminal roaming, the first AP does not send a simulation beacon frame after the second terminal switches to the operating channel of the first AP.

In optional implementation, the first AP receives an instruction message sent by a second AP. The instruction message includes a BSSID of the second AP. The instruction message instructs the first AP to send a simulation beacon frame by using the BSSID of the second AP. An operating channel of the second AP and the first channel are different. The first AP sends the simulation beacon frame at a first power by using the first channel. A first address field of the simulation beacon frame includes a broadcast address. The first power is less than a default transmit power of the first AP.

In this implementation manner, compatibility between the second terminal and the first AP is improved. In addition, in another optional manner of triggering terminal roaming, the first AP does not send a simulation beacon frame after the second terminal switches to the operating channel of the first AP.

In optional implementation, the first AP periodically sends multiple simulation beacon frames to the second terminal by using the first channel. The multiple simulation beacon frames include the simulation beacon frame sent at the first power. After a quantity of times that the first AP sends the simulation beacon frames reaches a threshold, the first AP stops sending the simulation beacon frames.

The first AP may periodically send, at a power that is less than a default transmit power of the first AP, the simulation beacon frames to the second terminal by means of unicast/broadcast, or periodically send, at a gradually decreasing transmit power, the simulation beacon frames to the second terminal by means of unicast/broadcast, and stop sending the simulation beacon frames to the second terminal when the quantity of times of sending the simulation beacon frames reaches the threshold (for example, three or four simulation beacon frames).

According to a second aspect, an access point is provided. The access point has functions of implementing actual access point behavior in the foregoing method. The functions may be implemented by using hardware or by executing corresponding software by hardware. The hardware or software includes one or more modules corresponding to the functions.

According to a third aspect, an access point is provided. The access point includes a transceiver and a processing circuit. The processing circuit sends, by using the transceiver and a first channel, a unicast channel switching message to a first terminal associated with the AP. The unicast channel switching message is used to instruct the first terminal to switch from the first channel to a second channel. A receiver address of the unicast channel switching message is an address of the first terminal. The first channel is an operating channel of the AP. The second channel and the first channel are different. After the unicast channel switching message is sent, the processing circuit retains the first channel as the operating channel of the AP.

The access point may further include a memory. The memory is configured to couple with the processing circuit and store a program instruction and data that are necessary for the access point.

According to another aspect, a computer storage medium is provided. The computer storage medium is configured to store a computer software instruction used for the foregoing access point, and the computer software instruction includes a program that is designed for executing the foregoing aspects.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show only some embodiments of the present invention, and a person of ordinary skill in the art may still derive other drawings from these accompanying drawings without creative efforts.

DETAILED DESCRIPTION OF EMBODIMENTS

The technical solutions of the present invention are further described in detail with reference to accompanying drawings and embodiments as follows:

A method for triggering terminal roaming by an access point provided in this application is applied to a WLAN system, and the WLAN system may include a terminal and at least two APs. Optionally, the WLAN system may further include a controller. For example, if a Control And Provisioning of Wireless Access Points (CAPWAP) protocol runs between an AP and the controller, the controller is an access controller (AC) in the CAPWAP protocol, and the AP is a wireless termination point (WTP) in the CAPWAP protocol.

Figure 1:
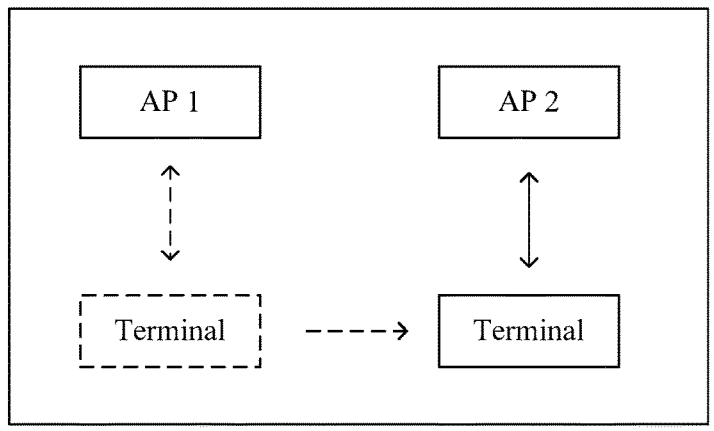
FIG. 1 is a schematic structural diagram of a WLAN system according to the present invention.

A WLAN system shown in FIG. 1 is used as an example for description. The WLAN system includes a terminal and two APs. The two APs are an AP 1 and an AP 2. In the following descriptions, an AP that is associated with the terminal before channel switching is referred to as a first AP, and an AP that is associated with the terminal after channel switching is referred to as a second AP. In a process described below in this specification, the AP 1 is the first AP, and the AP 2 is the second AP.

The terminal in FIG. 1 may be, for example, a mobile phone, a tablet computer, a personal computer, or a wearable device. The terminal does not support wireless network management. Optionally, the WLAN system may further include a terminal that supports wireless network management. For a terminal that supports wireless network management, an AP associated with the terminal can instruct, by using a mechanism defined in a wireless network management protocol, the terminal to roam to an AP with which the terminal finally needs to associate, that is, a target AP. Before the terminal associates with the first AP, the terminal needs to send an association request frame to the first AP. The association request frame may include a capability of the terminal, so that the first AP can determine whether the terminal supports the wireless network management protocol.

Figure 2:
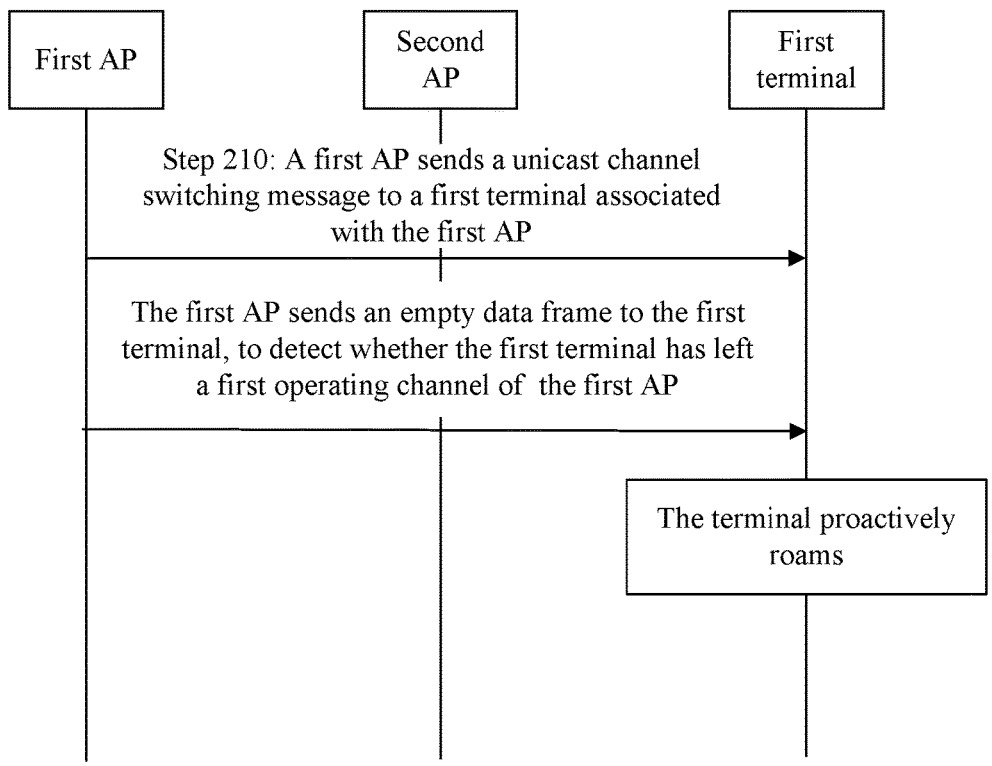
FIG. 2 is an information interaction diagram of a method for triggering terminal roaming by an access point according to an embodiment of the present invention.

FIG. 2 is an information interaction diagram of a method for triggering terminal roaming by an access point according to an embodiment of the present invention. As shown in FIG. 2, the method may include the following step:

Step 210: A first AP sends, by using a first channel, a unicast channel switching message to a first terminal associated with the first AP, where the unicast channel switching message is used to instruct the first terminal to switch from the first channel to a second channel, a receiver address (RA) of the unicast channel switching message is an address of the first terminal, the first channel is an operating channel of the first AP, and the second channel and the first channel are different; and retains the first channel as the operating channel of the first AP after the unicast channel switching message is sent.

Herein, the unicast channel switching message may be a unicast channel switch announcement (CSA) frame. The unicast CSA frame includes information about the second channel, and a receiver address of the CSA frame is a medium access control (MAC) address of the first terminal. The MAC address of the first terminal is a unicast address.

Optionally, before the first AP sends the unicast channel switching message to the first terminal associated with the first AP, the first AP can identify, according to a preset first algorithm, whether the first terminal meets a roaming condition. The first AP sends the unicast channel switching message to the first terminal if the first terminal meets the roaming condition, so as to trigger roaming of the first terminal. Alternatively, the first AP may receive an instruction from the controller, and determine that the first terminal meets the roaming condition and trigger roaming of the first terminal.

The first AP sends, by using the first channel, the unicast channel switching message to the first terminal associated with the first AP. Generally, a conventional channel switching message instructs the first AP and the first terminal associated with the first AP to simultaneously switch to the second channel. However, the unicast channel switching message is sent by the first AP to delude the first terminal into performing a channel switching operation. That is, the unicast channel switching message instructs the first terminal to switch to the second channel (that is, instructs the first terminal to leave the first channel), but the first AP does not switch to the second channel and remains on the current first channel.

The second channel may be any channel that is different from the first channel. Optionally, the second channel may be an operating channel of another AP.

After switching to the second channel, the first terminal cannot find the first AP, and attempts to associate with a new AP. Because the first terminal is in an associated state at this moment, a process of associating with a new AP can be simplified. It can be learnt that the unicast channel switching message makes a process of switching performed by the first terminal relatively smooth.

Optionally, after sending the unicast channel switching message to the first terminal, the first AP can send an empty data frame to detect whether the first terminal has left the first operating channel of the first AP. If the first AP receives a response frame returned by the first terminal, the first terminal has not left the first operating channel of the first AP, that is, the first terminal still stays on the first operating channel of the first AP. If the first AP does not receive a response message returned by the first terminal, the first terminal may have left the first operating channel of the first AP.

When the first AP detects that the first terminal has not left the first channel, the first AP can send a unicast channel switching message to the first terminal again. If the first terminal still stays on the first AP, the first AP can send a disassociation message to the first terminal, to disassociate the first AP from the first terminal. The disassociation message may be a disassociation frame or a deauthentication frame. Alternatively, the first AP may send a disassociation message after sending more unicast channel switching messages to the first terminal.

Optionally, if the second channel is an operating channel of the second AP, the first AP can send an instruction message to the second AP. The instruction message instructs the first terminal associated with the first AP to switch to the second channel. The instruction message includes a basic service set identifier (BSSID) of the first AP and the address of the first terminal. The BSSID may be a radio MAC address of the first AP. If the first AP has multiple BSSIDs, the BSSID in the instruction message is a BSSID in a basic service set (BSS) associated with the first terminal. The second AP transmits a data frame to the first terminal according to the address of the first terminal. A BSSID field of the data frame is filled in with the BSSID of the first AP.

After the first terminal switches to the second channel according to the unicast channel switching message, where the second channel is the operating channel of the second AP, the first AP sends an indication message to the second AP to indicate that the first terminal has switched to the second channel that is different from the first channel. The second AP transmits, according to the address of the first terminal, the data frame that includes the BSSID of the first AP to the first terminal, and the address may be the MAC address of the first terminal. Herein, transmission includes but is not limited to the following behaviors: both receiving and sending, only receiving and not sending, and only sending and not receiving.

In a process of sending a data frame from the second AP to the first terminal, an address 1 field (that is, a receiver address) of the data frame is filled in with the address of the first terminal, and an address 2 field (that is, a transmitter address (TA)) of the data frame is filled in with the BSSID of the first AP.

In a process of sending a data frame from the first terminal to the second AP, an address 1 field (that is, a receiver address) of the data frame is filled in with the BSSID of the first AP, and an address 2 field (that is, a transmitter address TA) of the data frame is filled in with the address of the first terminal.

If the data frame carries an aggregate MAC service data unit (A-MSDU), an address 3 field is also filled in with the BSSID of the first AP.

The second AP transmits the data frame to the first terminal according to a location of the address, in the data frame, of the first terminal. The BSSID field of the data frame is a field that is in the data frame and that is filled in with a BSSID. For example, when the second AP sends a data frame to the first terminal, an address 2 field of the data frame should be filled in with a BSSID; in this case, the address 2 field is a BSSID field. When the data frame carries an A-MSDU, an address 3 field is also a BSSID field.

After the first terminal hands over to the second AP on the second operating channel, the second AP sends and receives a data frame for the first terminal by simulating the first AP according to the MAC address of the first terminal and the BSSID of the first AP, so that the first terminal can still send and receive a data frame normally. That is, before the first terminal roams, a service interruption time of the first terminal is reduced.

Optionally, after the second AP receives the indication message sent by the first AP, the second AP on the second channel can send, at a first power, a simulation beacon frame to the first terminal by means of unicast, or send, at a first power, a simulation beacon frame to the first terminal by means of broadcast. The first power is less than a default transmit power of the second AP.

A beacon frame is a management frame. A simulation beacon frame is a beacon frame sent by an AP by simulating another AP by using a BSSID of the another AP.

A beacon frame is generally a broadcast frame, that is, a receiver address of the beacon frame is generally a broadcast address. However, a receiver address of the simulation beacon frame may be the address of the first terminal, that is, may be a unicast address. For example, if the second AP sends the simulation beacon frame to the first terminal by means of unicast, an address 1 field (that is, a receiver address) of the simulation beacon frame is filled in with the address of the first terminal, where the address may be the MAC address of the first terminal; an address 2 field (that is, a transmitter address) of the simulation beacon frame is filled in with the BSSID of the first AP; an address 3 field of the simulation beacon frame is filled in with the BSSID of the first AP. In this way, the second AP sends the simulation beacon frame to the first terminal by simulating the first AP.

If the second AP sends the simulation beacon frame to the first terminal by means of broadcast, an address 1 field of the simulation beacon frame is filled in with a broadcast address, an address 2 field of the simulation beacon frame is filled in with the BSSID of the first AP, and an address 3 field of the simulation beacon frame is filled in with the BSSID of the first AP. In this way, the second AP sends the simulation beacon frame to the first terminal by simulating the first AP. When the second AP sends the simulation beacon frame to the first terminal by means of broadcast, because another terminal associated with the second AP receives only a beacon frame whose address 2 field in the simulation beacon frame is filled in with a BSSID of the second AP, the simulation beacon frame that is sent to the first terminal by the second AP by simulating the BSSID of the first AP has no effect on the another terminal associated with the second AP.

The first power is less than the default transmit power of the second AP. The default transmit power is a general transmit power or a normal transmit power at which, in a normal condition, a beacon frame is sent to a terminal associated with the second AP.

Further, the second AP can periodically send multiple simulation beacon frames to the first terminal by using the second channel. A transmit power at which at least one of the multiple simulation beacon frames is sent is the first power. For example, the second AP periodically sends, at the first power, the multiple simulation beacon frames to the first terminal by using the second channel. Alternatively, the second AP periodically sends the multiple simulation beacon frames to the first terminal by using the second channel, and gradually decreases a transmit power.

The second AP can send the simulation beacon frames to the first terminal at a power that is less than the default transmit power of the second AP, or send the simulation beacon frames to the first terminal at a gradually decreasing transmit power, so that the first terminal determines that the first AP is sending a beacon frame. When a beacon frame signal detected by the first terminal is weak, the first terminal may determine that weakening of the beacon frame signal from the first AP indicates quality degradation of communication between the first terminal and the first AP. Therefore, the first terminal may initiate roaming, that is, proactive roaming of the first terminal is triggered. Different terminals may have different configurations. After channel switching, if a terminal receives no beacon frame, roaming of the terminal is not triggered and the terminal may return to a channel used before the switching. Therefore, sending a beacon frame by the second AP by simulating the first AP can improve compatibility between the terminal and the AP. In addition, in another optional manner of triggering terminal roaming, the second AP does not send a simulation beacon frame after the first terminal switches to the operating channel of the second AP.

Optionally, the second AP periodically sends multiple simulation beacon frames to the first terminal by using the second channel. The multiple simulation beacon frames include the simulation beacon frame sent at the first power. After a quantity of times that the second AP sends the simulation beacon frames reaches a threshold, the second AP stops sending the simulation beacon frames.

The threshold herein may be specified according to an actual condition, for example, the threshold may be three or four simulation beacon frames. The second AP stops sending the simulation beacon frames to the first terminal. If the terminal receives no beacon frame within a preset time period, roaming is triggered.

It can be known that the second AP triggers proactive roaming of the first terminal by sending, to the first terminal, a simulation beacon frame whose signal strength is weak, or triggers proactive roaming of the first terminal by not sending a simulation beacon frame.

In another embodiment, if the first AP selects, by using a preset second algorithm, the second AP as an AP with which the first terminal needs to finally associate, that is, a target AP, the first AP determines whether an AP associated with the first terminal after the first terminal proactively roams is the second AP. If no, the steps in the foregoing embodiment are repeated. That is, when the first terminal roams to a non-target AP, that is, a transitive AP, the transitive AP triggers proactive roaming of the first terminal, and the transitive AP adds the MAC address of the first terminal to a temporary blacklist, to prevent the first terminal from roaming to the transitive AP again, until the first terminal roams to the second AP. When the first terminal roams to the second AP, the transitive AP obtains, by means of a switch, a controller, or communication between APs, a message indicating that the first terminal has associated with the target AP. At this moment, the transitive AP removes the MAC address of the first terminal from the temporary blacklist.

With reference to FIG. 1, in a process of switching from the AP 1 to the AP 2 by the terminal, the AP 1 may be referred to as the first AP, and the AP 1 triggers channel switching of the terminal; the AP 2 may be referred to as the second AP, and optionally, the AP 2 sends a simulation beacon frame and/or a data frame to the terminal. In a process of switching from the AP 2 to the AP 1 by another terminal, the second AP triggers channel switching of the another terminal, and optionally, the first AP sends a simulation beacon frame and/or a data frame to the terminal.

Figure 3:
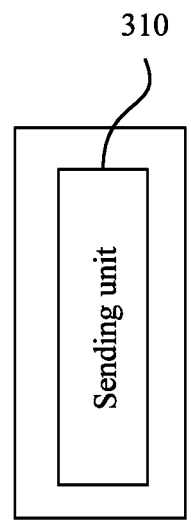
FIG. 3 is a schematic structural diagram of an access point according to an embodiment of the present invention.

FIG. 3 is a possible schematic structural diagram of an access point involved in the foregoing embodiment.

The access point includes at least a sending unit 310, configured to send, by using a first channel, a unicast channel switching message to a first terminal associated with the AP. The unicast channel switching message is used to instruct the first terminal to switch from the first channel to a second channel. A receiver address of the unicast channel switching message is an address of the first terminal. The first channel is an operating channel of the AP. The second channel and the first channel are different.

After the unicast channel switching message is sent, the first channel is retained as the operating channel of the AP.

Optionally, the access point may further include: a receiving unit 320, configured to receive an instruction message sent by a second AP, where the instruction message instructs a second terminal associated with the second AP to switch to the first channel, the instruction message includes a BSSID of the second AP and an address of the second terminal, and an operating channel of the second AP and the first channel are different; and a transmission unit 330, configured to transmit a data frame to the second terminal according to the address of the second terminal, where a BSSID field of the data frame is filled in with the BSSID of the second AP.

Optionally, the receiving unit 320 is further configured to receive an instruction message sent by a second AP, where the instruction message instructs a second terminal associated with the second AP to switch to the first channel, the instruction message includes a BSSID of the second AP and an address of the second terminal, and an operating channel of the second AP and the first channel are different; the sending unit 310 is further configured to send a simulation beacon frame to the second terminal at a first power by using the first channel, where a first address field of the simulation beacon frame includes the address of the second terminal, a second address field of the simulation beacon frame includes the BSSID of the second AP, and a third address field of the simulation beacon frame includes the BSSID of the second AP. The first power is less than a default transmit power of the first AP.

Optionally, the receiving unit 320 is further configured to receive an instruction message sent by a second AP, where the instruction message includes a BSSID of the second AP, the instruction message instructs the AP to send a simulation beacon frame by using the BSSID of the second AP, and an operating channel of the second AP and the first channel are different; the sending unit 310 is further configured to send a simulation beacon frame at a first power by using the first channel, where a first address field of the simulation beacon frame includes a broadcast address.

Optionally, the access point further includes a stopping unit 340.

The sending unit 310 is further configured to periodically send multiple simulation beacon frames to the second terminal by using the first channel. The multiple simulation beacon frames include the simulation beacon frame sent at the first power.

The stopping unit 340 is configured to: after a quantity of times that the AP sends the simulation beacon frames reaches a threshold, stop sending the simulation beacon frames.

Functions of functional modules of the access point can be implemented by means of the steps in the foregoing embodiment. Therefore, a specific working process of the access point provided in the present invention is not described herein again.

Figure 4:
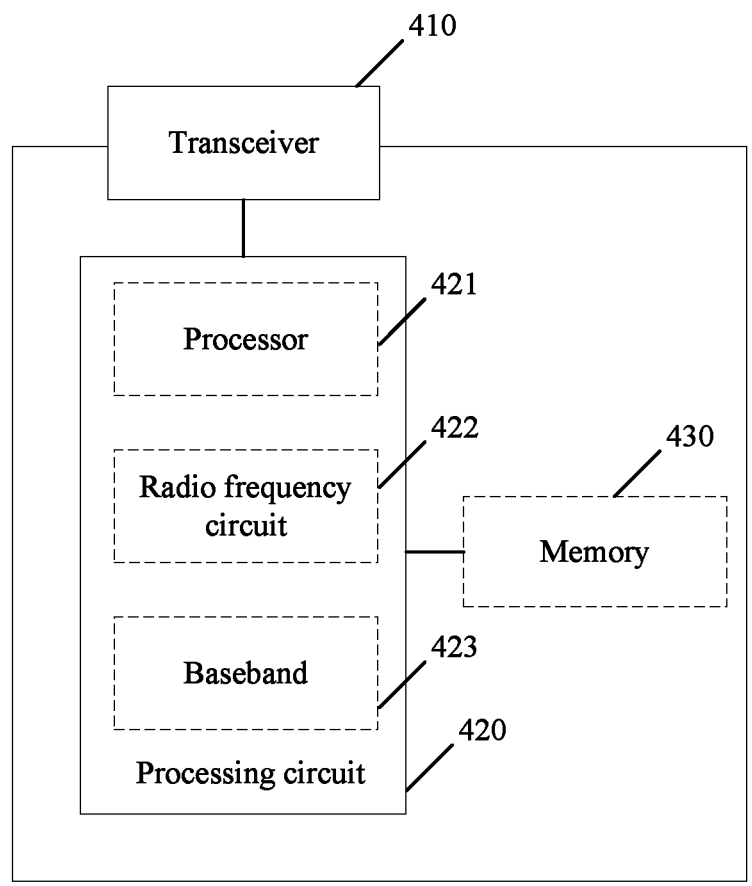
FIG. 4 is a schematic structural diagram of another access point according to an embodiment of the present invention.

FIG. 4 is another possible schematic structural diagram of an access point involved in the foregoing embodiment.

The access point includes at least a transceiver 410 (for example, an antenna) and a processing circuit 420, and optionally, may further include a memory 430. The processing circuit 420 may include a processor 421, a radio frequency circuit 422, and a baseband 423.

The processor 421 may be a central processing unit (CPU) or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 430 may include a volatile memory, for example, a random-access memory (RAM). The memory 430 may also include a non-volatile memory, for example, a read-only memory (ROM), a flash memory, a hard disk drive (HDD), or a solid-state drive (SSD). The memory 430 may further include a combination of the foregoing memories. The memory 430 stores program code, and transmits the stored program code to the processor 421.

The transceiver 410 is configured to send, by using a first channel, a unicast channel switching message to a first terminal associated with the AP. The unicast channel switching message is used to instruct the first terminal to switch from the first channel to a second channel. A receiver address of the unicast channel switching message is an address of the first terminal. The first channel is an operating channel of the AP. The second channel and the first channel are different.

The processing circuit 420 is configured to retain the first channel as the operating channel of the AP after the unicast channel switching message is sent.

The processor 421 executes various functions used for communication with the first terminal. On an uplink, the transceiver 410 receives an uplink signal from the first terminal, and performs demodulation on the uplink signal. Then, the processor 421 performs processing to restore service data and signaling information sent by the first terminal. On a downlink, the processor 421 performs processing on service data and signaling information, and the transceiver 410 performs demodulation to generate a downlink signal and transmits the downlink signal to the first terminal. The processor 421 also executes a processing process related to an access point in FIG. 2 and/or another process used for a technology described in this application. The memory 430 is configured to store program code and data of the access point.

Steps of methods or algorithms described in the embodiments disclosed in this specification may be implemented by hardware, a software module executed by a processor, or a combination thereof. A software instruction may include a corresponding software module. The software module may be stored in a random access memory, a flash memory, a read-only memory, an erasable programmable read-only memory (EPROM), an electrically erasable programmable read-only memory (EEPROM), a hard disk, a compact disc read-only memory (CD-ROM), or any other form of storage medium well known in the art. An exemplary storage medium is coupled with the processor, so that the processor can read information from the storage medium and write information into the storage medium. Certainly, the storage medium may also be a component of the processor. The processor and the storage medium may be located in an ASIC. In addition, the ASIC may be located in user equipment. Certainly, the processor and the storage medium may be located in the user equipment as discrete components.

A person of skill in the art should be able to realize that in one or more of the foregoing examples, the functions described in the present invention may be implemented by using hardware, software, firmware, or any combination thereof. When the present invention is implemented by using software, the foregoing functions may be stored in a computer-readable medium or transmitted as one or more instructions or code in the computer-readable medium.

The objectives, technical solutions, and benefits of the present invention are further described in detail in the foregoing specific embodiments. It should be understood that the foregoing descriptions are only specific embodiments of the present invention, but are not intended to limit the protection scope of the present invention. Any modification, equivalent replacement, or improvement made based on the solution of the present invention shall fall within the protection scope of the present invention.

What is claimed is:

1. A method for triggering terminal roaming by an access point (AP), the method comprising:
sending, by a first AP over a first channel, a unicast channel switching message to a first terminal associated with the first AP, wherein the unicast channel switching message instructs the first terminal to switch from the first channel to a second channel, a receiver address of the unicast channel switching message is an address of the first terminal, the first channel is an operating channel of the first AP, and the second channel and the first channel are different;

retaining the first channel as the operating channel of the first AP after the unicast channel switching message is sent;

receiving, by the first AP, an instruction message sent by a second AP, wherein the instruction message instructs a second terminal associated with the second AP to switch to the first channel, the instruction message comprises a basic service set identifier (BSSID) of the second AP and an address of the second terminal, and an operating channel of the second AP and the first channel are different; and sending, by the first AP, a simulation beacon frame to the second terminal at a first power by using the first channel, wherein the simulation beacon frame is a beacon frame sent by the first AP by simulating the second AP by using the BSSID of the second AP, and the first power is less than a default transmit power of the first AP.

2. An access point (AP) comprising:

a processor; and a memory storing instructions that when executed configure the processor to:

send, over a first channel, a unicast channel switching message to a first terminal associated with the AP, wherein the unicast channel switching message instructs the first terminal to switch from the first channel to a second channel, a receiver address of the unicast channel switching message is an address of the first terminal, the first channel is an operating channel of the AP, and the second channel and the first channel are different;

retain the first channel as the operating channel of the AP after the unicast channel switching message is sent;

receive an instruction message sent by a second AP, wherein the instruction message instructs a second terminal associated with the second AP to switch to the first channel, the instruction message comprises a basic service set identifier (BSSID) of the second AP and an address of the second terminal, and an operating channel of the second AP and the first channel are different; and send a simulation beacon frame to the second terminal at a first power by using the first channel, wherein the simulation beacon frame is a beacon frame sent by the first AP by simulating the second AP by using the BSSID of the second AP, and the first power is less than a default transmit power of the first AP.

3. An access point (AP) comprising a transceiver and a processing circuit, wherein:

the processing circuit is configured to:

send, by using the transceiver and a first channel, a unicast channel switching message to a first terminal associated with the AP, wherein the unicast channel switching message instructs the first terminal to switch from the first channel to a second channel, a receiver address of the unicast channel switching message is an address of the first terminal, the first channel is an operating channel of the AP, and the second channel and the first channel are different;

retain the first channel as the operating channel of the AP after the unicast channel switching message is sent;

receive an instruction message sent by a second AP, wherein the instruction message instructs a second terminal associated with the second AP to switch to the first channel, the instruction message comprises a basic service set identifier (BSSID) of the second AP and an address of the second terminal, and an operating channel of the second AP and the first channel are different; and send a simulation beacon frame to the second terminal at a first power by using the first channel, wherein the simulation beacon frame is a beacon frame sent by the first AP by simulating the second AP by using the BSSID of the second AP, and the first power is less than a default transmit power of the first AP.

* * * * *